United States Patent [19]

Wildorf

[11] 3,956,559

[45] May 11, 1976

[54] SOLAR CONTROL SAFETY WINDOW

[75] Inventor: Michael E. Wildorf, Malden, Mass.

[73] Assignee: Material Distributors Corporation, Woburn, Mass.

[22] Filed: July 17, 1974

[21] Appl. No.: 489,157

Related U.S. Application Data

[63] Continuation of Ser. No. 235,152, March 16, 1972, abandoned.

[52] U.S. Cl. .................... 428/214; 428/215; 428/439; 428/458; 428/463; 428/480; 428/483; 428/522

[51] Int. Cl.² ............... B32B 17/08; B60J 1/06; B60J 3/00; B32B 15/08

[58] Field of Search .......... 161/199, 214, 231, 257, 161/1; 156/106; 117/124, 6, 70 R, 71 R, 71 M, 75; 428/439, 458, 463, 480, 483, 522, 214, 215, 339

[56] References Cited
UNITED STATES PATENTS

| | | |
|---|---|---|
| 2,837,454 | 6/1958 | Watkins et al. ............ 161/199 |
| 3,069,301 | 12/1962 | Buckley et al. ............ 161/199 X |
| 3,069,746 | 12/1962 | Scharf ............ 161/232 X |
| 3,170,833 | 2/1965 | Noyes ............ 161/214 X |
| 3,290,203 | 12/1966 | Antonson et al. ............ 161/214 X |
| 3,681,179 | 8/1972 | Theissen ............ 161/214 X |
| 3,718,535 | 2/1973 | Armstrong et al. ............ 156/106 X |
| 3,775,226 | 11/1973 | Windorf ............ 428/458 |
| 3,776,805 | 12/1973 | Hansen ............ 428/458 |
| 3,849,244 | 11/1974 | Groth ............ 428/437 |

Primary Examiner—George F. Lesmes
Assistant Examiner—Charles E. Lipsey
Attorney, Agent, or Firm—Morse, Altman, Oates & Bello

[57] ABSTRACT

A solar control safety window, for example, a windshield, comprises a vapor deposited aluminum coat in a laminated sheet assemblage that is bonded between two sheets of glass. Materials are disclosed for effective bonding. The aluminum coat partially transmits light specifically, while it largely reflects radiation generally, in order to provide a safety window with optimum radiation control.

1 Claim, 2 Drawing Figures

SOLAR CONTROL SAFETY WINDOW

This is a continuation of application Ser. No. 235,152 filed on Mar. 16, 1972, now abandoned.

BACKGROUND AND SUMMARY

The present invention relates to anti-glare safety glass, including windshields and other vehicle windows. In the past such anti-glare safety glass has been tinted with a radiation absorptive medium in order to reduce light transmission. However, such tinted safety glass suffers from heat that is generated by absorbed infrared and visible radiation from the sun with the result that this energy is re-radiated into the vehicle. Such a tinted windshield, for example, re-radiates energy to the face of the driver, causing discomfort which reduces driving ease.

The primary object of the present invention is to substitute, for tinted safety windows, a solar control safety window comprising a partially specularly reflective, solar control film laminated between two sheets of safety glass. The solar control film includes a vapor deposited aluminum coat, which partially transmits light, interposed between a pair of moisture permeable polymeric strata, each of which is self supporting. Butyrate strata, which have been laminated to opposite outer faces of the polymeric strata by acrylic adhesive, are adhered to the inner faces of the sheets of safety glass under heat and pressure.

Other objects of the present invention will in part be obvious and will in part appear hereinafter.

The present invention thus comprises the products and processes, together with their components, steps and interrelationships, which are exemplified in the present disclosure the scope of which will be indicated in the appended claims.

BRIEF DESCRIPTION OF THE DRAWINGS

For a fuller understanding of the nature and objects of the present invention, reference is made to the following specification, taken in connection with the accompanying drawing, wherein.

DETAILED DESCRIPTION

Figure 1:
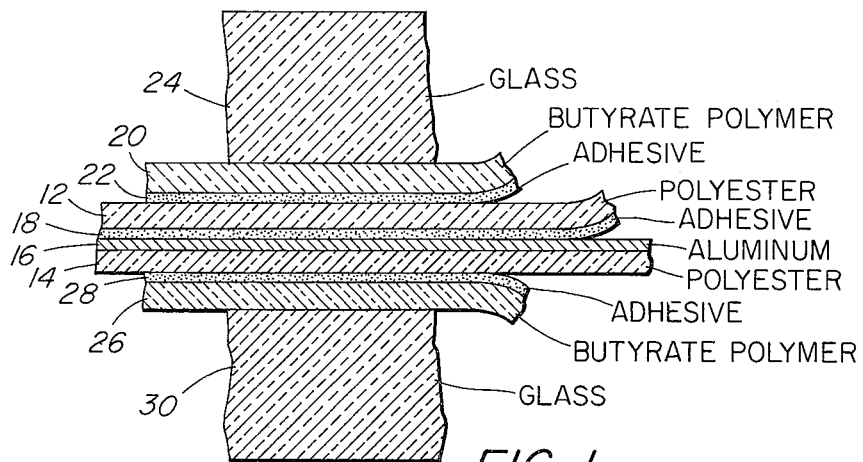
FIG. 1 is an exaggerated cross-sectional view of a safety glass assemblage embodying the present invention.

Generally the safety window assemblage of FIG. 1 comprises an inner laminated sequence including a semi-transparent vapor deposited aluminum stratum; and a pair of opposed outer laminated sequences, each including a weather resistant glass sheet. Specifically, the inner laminated sequence includes a pair of flexible polymeric strata 12, 14, at the inner face of one of which is a vapor deposited aluminum coating 16 and at the inner face of the other of which is an adhesive coating 18 by which the flexible polymeric strata are bonded together. One of the outer laminated sequences includes a bonding stratum 20 that is adhered to the inner laminated sequence by an adhesive coating 22 and that is adhered to a glass sheet 24 under heat and pressure. The other of the outer laminated sequences includes a bonding stratum 26 that is adhered to the inner laminated sequence by an adhesive coating 28 and that is adhered to a glass sheet 30 under heat and pressure. All of these strata and coatings, except the aluminum stratum, are optically clear and transparent.

In accordance with the present invention, flexible polymeric strata 12, 14 are composed of a polyester such as that sold by DuPont under the trademark Mylar or such as that sold by ICI under the trademark Melinex. Aluminum stratum 16 is produced by controlled density, vacuum vapor deposition upon the surface of polyester stratum 14. Adhesive coating 18, which bonds polyester stratum 18 to aluminum stratum 16, preferably is cast from a ketonic and/or alcoholic solution of a polyester or an acrylic. For example, the polyester is Mylar, the acrylic is methyl and/or ethyl methacrylate, the ketone is methyl ethyl ketone and the alcohol is toluol. In accordance with the present invention, bonding strata 20, 26 are composed of a butyrate such as cellulose acetate butyrate or butyl acetate. Adhesive coatings 22, 28 have the same composition as coating 18. Finally, glass sheets 24, 30 are composed of high quality, bubble free, crown formulation.

Typically, polyester strata 12, 14 each ranges in thickness from ¼ to 1 mil, preferably being approximately ½ mil. Adhesive strata 18, 22, 28 each ranges in thickness from 0.0001 to 0.0003 inch, preferably being approximately 0.0002. Butyrate strata 20, 26 each ranges from 1 to 5 mil, preferably being approximately 3 mil. Vapor deposited aluminum stratum 16 is characterized by a visible light transmission of 5% to 90%, having a thickness of no more than 300 angstrom units. Each of glass sheets ranges in thickness from ⅛ to ½ inch. The resulting product has a pleasant, soft grey color that permits excellent visibility.

The method steps involved in fabricating the product of FIG. 1 comprise the following. First aluminum stratum 16 is vapor deposited on polyester stratum 14. Next polyester strata 12, 14 are laminated together with a solution of adhesive 18 therebetween to form an inner assemblage. Next butyrate strata 20, 26 are laminated on to opposite sides of the inner assemblage with organic solutions of adhesive 22, 28 between them and the inner assemblage. Finally, following thorough drying to form an intermediate assemblage including the original inner assemblage as well as the butyrate strata, the intermediate assemblage is interposed between glass sheets 24 and 30 and the entire assemblage is transversely compressed at a temperature above the softening point of the butyrate strata in order to permanently integrate the entire product.

Figure 2:
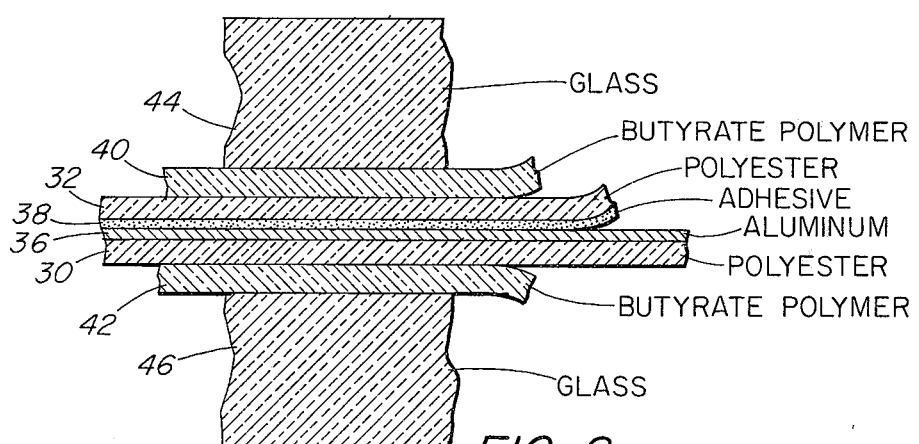
FIG. 2 is an exaggerated cross-sectional view of an alternative safety glass assemblage embodying the present invention.

An alternative embodiment is shown in FIG. 2 as comprising an inner assemblage including polyester strata 30, 32, aluminum stratum 36 and adhesive stratum 38, all like their counterparts 12, 14, 16, 18 in FIG. 1. Here however, butyrate strata 40, 42 are interposed directly between the intermediate assemblage and glass sheets 44, 46. In the formation of this product, butyrate strata 40, 42 are cast in solution directly onto the opposite faces of the inner assemblage and dried. Finally, the intermediate assemblage is interposed between glass sheets 44, 46 and the entire assemblage is transversely compressed at a temperature above the softening point of the butyrate strata in order to permanently integrate the entire product.

In one form, one or more of polyester strata 12, 14 and 32, 34 are composed of weatherable, ultraviolet light absorbing polymer effective in the range of from 200 to 380 nanometers, that does not darken or decompose upon prolonged exposure to ultraviolet light. For example, such a polymer is a weatherable polyester containing, as an ultraviolet absorbent, a dispersed substituted benzophenone of the type sold by Antara Chemicals under the trademark Uvinul.

In other alternative embodiments, polyester strata 12, 32 are impregnated with fade resistant azo dyes, for example, gold, bronze, grey, blue, and green azo dyes of the type sold by GAF under the trademarks Azasol, Celliton or Genacon.

REMARKS

In operation, radiation from the sun upon the products of FIGS. 1 and 2 is for the most part reflected, only a portion of the visible light being transmitted. In a vehicle, the result is excellent visibility without re-radiation of head from the window to the face of the driver or other occupants. Since certain changes may be made in the above disclosure without departing from the scope of the invention thereof, it is intended that all matters shown in the accompanying drawings or described in the foregoing specification be interpreted in an illustrative and not in a limiting sense.

What is claimed is:

1. A solar control safety window comprising, in laminated sequence, a first glass sheet, a first outer polymer stratum of cellulose acetate butyrate, a first inner polymer stratum composed of polyethylene terephthalate, a vapor deposited aluminum stratum, a second inner polymer stratum composed of polyethylene terephthalate, a second outer polymer stratum of cellulose acetate butyrate, at least one bonding stratum interposed between said first inner polymer stratum and said vapor deposited stratum, and a second glass sheet, each of said first inner polymer stratum and said second inner polymer stratum ranging in thickness from ¼ to 1 mil, each of said first outer polymer stratum and said second outer polymer stratum ranging in thickness from 1 to 5 mil, said vapor deposited aluminum stratum being partially light reflecting and partially light absorbing and being characterized by a light transmission ranging from 5% to 60%, each of said glass sheets ranging in thickness from ⅛ to ½ inch, said solar control safety window being optically clear, said first glass sheet and said first outer polymer stratum being in direct contact, said second glass sheet and said second outer polymer stratum being in direct contact, at least one of said inner polymer strata being optically clear and containing an ultraviolet absorption agent, a second bonding stratum being interposed between said first outer polymer stratum and said first inner polymer stratum and a third bonding stratum being interposed between said second outer polymer stratum and said second inner polymer stratum, all three bonding strata being cast from a solvent solution of a polyester or an acrylic polymer and ranging in thickness from 0.0001 to 0.0003 inch.

* * * * *